No. 868,673. PATENTED OCT. 22, 1907.
J. W. LAMBERT.
AUTOMOBILE TRANSMISSION GEARING.
APPLICATION FILED MAR. 27, 1905.
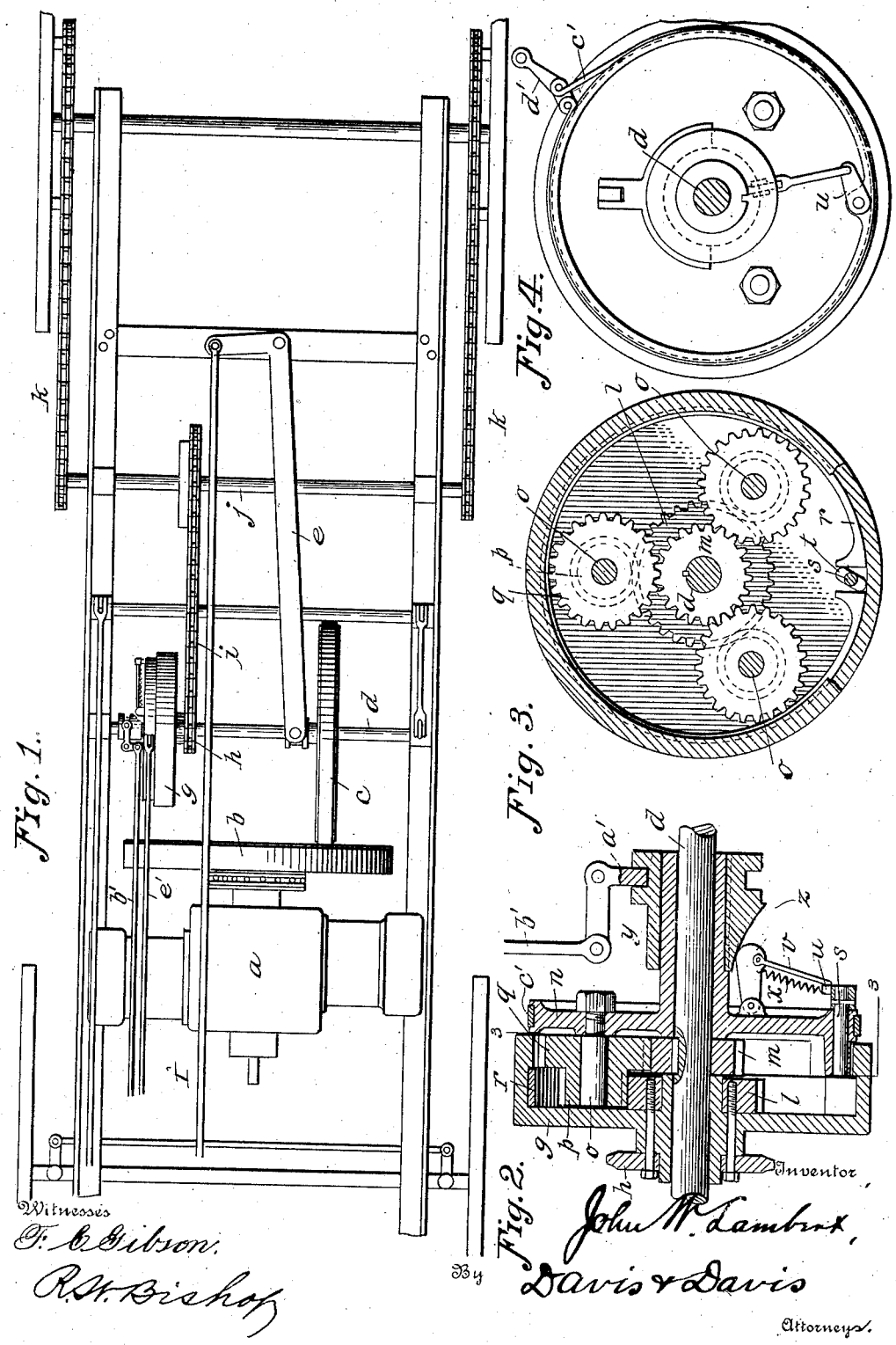
Witnesses
F. C. Gibson.
R. H. Bishop.
Inventor
John W. Lambert,
By Davis & Davis
Attorneys.

UNITED STATES PATENT OFFICE.

JOHN W. LAMBERT, OF ANDERSON, INDIANA.

AUTOMOBILE TRANSMISSION-GEARING.

No. 868,673.  Specification of Letters Patent.  Patented Oct. 22, 1907.

Application filed March 27, 1905. Serial No. 252,332.

*To all whom it may concern:*

Be it known that I, JOHN W. LAMBERT, a citizen of the United States of America, and a resident of Anderson, county of Madison, State of Indiana, have invented certain new and useful Improvements in Automobile Transmission-Gearing, of which the following is a full and clear specification, reference being had to the accompanying drawing, in which—

Figure 1 is a plan view of a frame of a motor-carriage showing my invention applied thereto; Figs. 2, 3 and 4, are detail views hereinafter more fully described of the supplemental reducing gearing.

In friction drive gears it is a well known fact that when the driven friction wheel is adjusted to a point near the center of the drive disk for slow speeds there is a loss in frictional efficiency. This loss is not a serious matter in most appliances but in heavy automobiles, such as trucks, where there is occasional demand for exertion of the maximum power of the engine at practically a minimum speed, it might be a serious objection.

It is, therefore, the object of my invention to improve the friction type of change speed gears in such a manner that a very low speed can be obtained without adjusting the friction-wheel so near to the center of the drive disk that any appreciable loss of frictional efficiency shall occur, as more fully hereinafter set forth.

To the accomplishment of this object and such others as may hereinafter appear, the invention consists of the parts and combination of parts hereinafter fully described, and particularly pointed out in the appended claims, reference being had to the accompanying drawings forming a part of this specification, in which the same reference characters designate like parts throughout the several views.

Referring to the drawings by letters, $a$ designates the engine, $b$ the drive disk on the drive shaft thereof, and $c$ the driven friction wheel which is slidably mounted on a transverse shaft $d$ and is adapted to be adjusted across the face of the drive disk by means of a bell-crank lever $e$ operable by the rod $f$ which extends forward to a point within convenient reach of the chauffeur.

Mounted loosely on the shaft $d$ is a cylindrical gear casing $g$ and rigidly mounted on a hub on this casing is a sprocket wheel $h$. A chain $i$ connects this wheel $h$ with a larger sprocket wheel on a transverse countershaft $j$ journaled in the vehicle frame and carrying at its ends the usual sprocket-wheels which are connected by chains $k$ to the usual sprocket wheels on the rear wheels of the vehicle. It will thus be observed that when the gear casing is locked so as to rotate with the shaft $d$, the drive will be directly through the sprocket wheels and chains, and the change in speed is obtained by adjusting the friction wheel across the face of the drive disk in the usual manner.

Within the gear case $g$ and rigidly attached thereto is a spur gear $l$, and adjacent to this spur gear is another smaller spur gear $m$ which is affixed to shaft $d$. Journaled loosely on the shaft $d$, close to the gear $m$ and covering the open adjacent side of the casing $g$ is a disk $n$ which carries three stub-shafts $o$ which project into the casing $g$. Each of these stub shafts has journaled upon it a double gear consisting of a small gear $p$ and a large gear $q$, the former meshing with gear $l$ and the latter with gear $m$. These double gears $p$ $q$ constitute planetary gears which rotate on their own axes $o$ and also bodily about the shaft $d$ when their supporting disk $n$ rotates.

An internal clutch-ring $r$ is arranged within the gear casing and is adapted to be expanded to engage the interior of the rim of the casing by means of a short rock-shaft $s$ journaled in the disk $n$ and provided with a cam $t$ on its inner end which works between the enlarged ends of the brake-band. This shaft $s$ has attached to its outer end a short arm $u$ which is connected by a rod $v$ to the outer end of an arm $w$ pivoted to the adjacent face of the disk $n$. Slidably mounted on the extended hub of the disk $n$ is a sleeve $y$ which is provided with a cam surface $z$ in position to actuate arm $w$ when said sleeve $y$ is thrown toward the disk $n$. To hold the arm $w$ normally against the cam $z$, a retractile spring $x$ is employed which connects the end of arm $u$ to an adjacent part of the disk $n$, preferably one of the ears to which arm $w$ is pivoted. A forked arm $a'$ engages the sleeve $y$, and this arm is operable by rod $b'$, which extends forward to a point within convenient reach of the chauffeur.

Set in a peripheral groove in the disk $u$ is brake-band $c'$, which is connected at its ends in the usual manner by a lever $d'$, which is operable by rod $e'$ which extends forward so as to be within convenient reach of the operator. When it is desired to drive direct through the sprocket wheels and chains, the operator applies, that is expands, the internal clutch-ring $r$ and slacks up on the external brake-band $c'$; whereupon the gear casing, the gear carrying disk and the attached parts will rotate solidly with the shaft $d$ and the power will be transmitted directly from the sprocket wheel $h$ as though the same were rigidly attached to shaft $d$. This direct drive will answer for all ordinary occasions, as the necessary change of speed may be obtained by shifting the friction wheel as usual. But should occasion demand the maximum power of the engine with a minimum speed of the vehicle, the supplemental reducing gearing is brought into action. This is done by simply loosening or releasing the internal clutch-ring and applying the external brake-band through the medium of their respective operating rods. When the external brake-band is thus applied the disk $n$ will remain stationary with respect to shaft $d$, and the gear case and its sprocket $h$ will be rotated at a slower speed than shaft $d$ through the medium of the gears described, the reduction in speed being determined by the proportions of the several gears. This supplemental reducing gear thus provides for exerting the full power of the engine to the transporting wheels of the vehicle without moving the friction disk so near to the center of the drive disk as to cause injury either to the fiber periphery thereof or loss of frictional efficiency.

It will be apparent to those skilled in the art that various mechanical embodiments of the invention are possible and I, therefore, do not wish to be limited to the exact arrangement and construction shown.

What I claim and desire to secure by Letters Patent is:

1. A gearing of the type set forth, comprising a driving disk, a driven disk adapted to be brought into frictional engagement with the driving disk, a driven shaft carrying the driven disk, means for shifting the driven disk on its shaft, a supplemental two-speed reducing gearing mounted wholly on said driven shaft and embodying a sprocket wheel loosely supported on said shaft, a train of gears permanently in mesh, one of said gears being connected to the sprocket wheel and one being rigidly secured to the driven shaft, means for locking the sprocket wheel and attached gear against independent rotation to drive the sprocket wheel directly at the same speed as the driven shaft, and means for locking some of said gears against rotation around the driven shaft, whereby the sprocket will be driven through the train of gears and at a slower speed than the driven shaft.

2. A gearing of the type set forth, comprising a driving disk, a driven disk adapted to be brought into frictional engagement with the driving disk, a driven shaft carrying the driven disk, means for shifting the driven disk on its shaft, and a supplemental two-speed reducing gearing mounted wholly on said shaft and embodying a sprocket wheel loosely mounted on said shaft, a gear wheel rigidly connected to said sprocket wheel, a gear wheel rigidly secured to the driven shaft, a disk loosely mounted on said shaft, gears carried by said disk and meshing with the gear connected to the sprocket wheel and with the gear connected to the shaft, and means for locking the sprocket wheel against independent rotation, and means for locking the disk carrying the gears against independent rotation on the shaft.

3. A gearing of the type set forth comprising a driving disk, a driven disk, a driven shaft carrying the driven disk, means for shifting the driven disk on its shaft, a speed reducing gearing mounted on the driven shaft and embodying a sprocket wheel loosely supported on said shaft, a train of gears permanently in mesh, one of said gears being rigidly connected to the sprocket wheel and one being rigidly secured to the driven shaft.

In testimony whereof I hereunto affix my signature in the presence of two witnesses this 25 day of March 1905.

JOHN W. LAMBERT.

Witnesses:
 GLAD. S. KING,
 GEO. A. LAMBERT.